No. 795,259. Patented July 18, 1905.

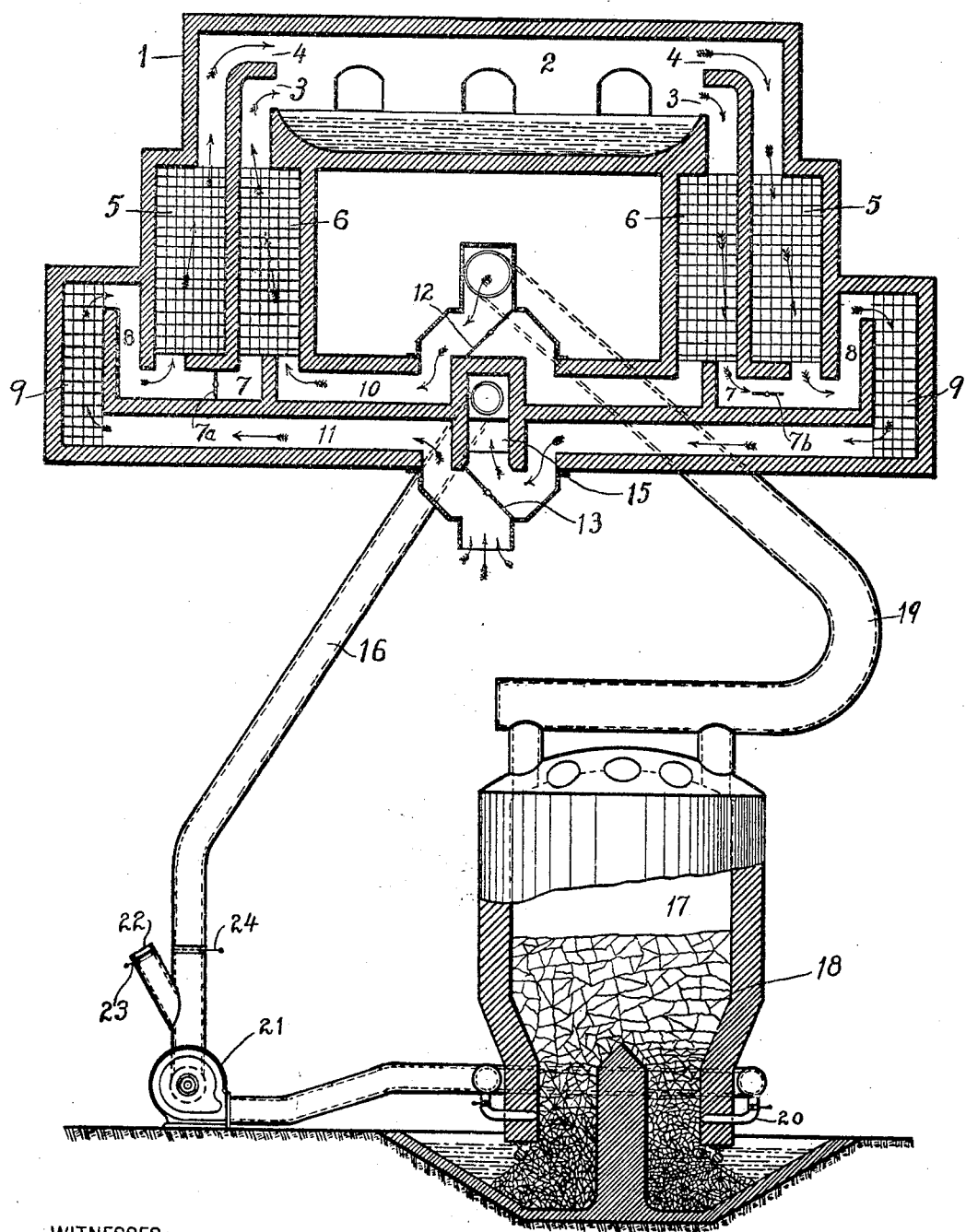

UNITED STATES PATENT OFFICE.

CARLETON ELLIS, OF NEW YORK, N. Y., ASSIGNOR TO ELDRED PROCESS COMPANY, OF NEW YORK, N. Y., A CORPORATION OF NEW YORK.

REGENERATIVE GAS-FURNACE.

SPECIFICATION forming part of Letters Patent No. 795,259, dated July 18, 1905.

Application filed February 15, 1905. Serial No. 245,705.

*To all whom it may concern:*

Be it known that I, CARLETON ELLIS, a citizen of the United States, and a resident of New York city, in the county of New York and State of New York, have invented certain new and useful Improvements in Regenerative Gas-Furnaces, of which the following is a specification.

This invention relates to gas-regenerative furnaces used in the manufacture of iron, steel, glass, and the like.

The object of this invention is to provide a means for the utilization of the sensible heat of producer-gas and to thereby better cool the escaping products of combustion.

In the furnaces at present in use employing the well-known type of reversing-regenerator the sensible heat of the producer-gas is from the nature of the system employed wholly wasted. The regenerative checker-work through which the producer-gas passes on its way to the furnace-hearth can never be depressed in temperature below the temperature of the entering producer-gas, and as this is ordinarily 1200° Fahrenheit or over a great loss of heat ensues. The air-regenerators, on the contrary, are cooled by the entering fresh air to a low temperature, and consequently the hot products of combustion in their passage through this regenerative checker-work are cooled to a great degree, wherefore more heat is retained or saved in these regenerators than in those through which the producer-gas passes.

My invention consists of a furnace having an auxiliary or third regenerator through which the air for combustion travels before entering the air-regenerator proper and which on the reversal is so constructed that the products of combustion from both the air and producer-gas regenerators combine and pass through this auxiliary checker-work, thereby giving up an additional portion of their sensible heat before departing to the stack-passage. As this auxiliary regenerator has been cooled by the entering air to a low temperature much lower than that of the producer-gas, it follows that the sensible heat of the producer-gas or a large portion thereof is conserved and utilized.

This invention is of especial value in connection with the gas-producing system described in my copending application, Serial No. 228,915, as a gas-producer operating by such a method of endothermic control with a fixed gas like carbon dioxid is operated smoothly and successfully only when the gaseous products of combustion used in aforesaid process have been well cooled. For this reason the apparatus herein described is a valuable means for economically applying the process of gas generation above mentioned.

The accompanying drawing represents a sectional view of a furnace constructed and arranged in accordance with my invention and shown with a gas-producer and connection thereto.

1 indicates a regenerative furnace of which 2 is the hearth-chamber and 3 4 the gas and air entrances in pairs at each end, the air-entrance being superimposed upon the gas-entrance. 5 and 6, respectively, are the air and gas regenerators, two of each connected with the entrances 4 3 and containing brick checker-work. Their lower ends connect by passages 7 8 with the auxiliary checker-work 9, and connection is established by passages 10 and 11 with the reversing-valve mechanism employing valves 12 13, whereby the regenerators are alternately placed in the air and gas lines leading to the furnaces and in the path of the products of combustion leading from the furnace to a stack-passage 15.

7$^a$ and 7$^b$ are dampers placed in the passages 7 7.

In using the system of gas production above mentioned, which dispenses with the use of steam and allows of the production of dry gas, the gas-producer connections shown in the accompanying drawing serve for illustration.

In the drawing, 17 indicates a gas-producer comprising a generating-chamber adapted to contain a deep bed of fuel 18 and having suitable inlet-apertures for feeding fuel from the top and a water seal at the lower end, from which the ashes are removed.

19 is a gas-pipe connecting the upper end of the producer with the furnace.

From a point in the stack-passage a pipe 16 leads back to the boshes of the producer 17 and enters the same by twyers 20, whereby products of combustion may be returned from the furnace to the hottest part of the fuel-bed and passed therethrough. This conduit contains a fan-blower 21, and back of said fan-blower there is an air-inlet 22 to said conduit for supplying air to the stack-gases for supporting combustion and cooling the gases. The air-inlet and the trunk of the pipe 16 are equipped with valves or dampers 23 24, whereby the proportion of the air and products of combustion in the draft-current may be accurately regulated to give the desired results for obtaining combustion within the producer on a low-temperature plane.

The furnace 1 may be operated in the following manner: The products of combustion pass out through the regenerators at one end and yield their heat to the checker-work, while the producer-gas and air are passed in at the opposite end through the other set of regenerators from which they absorb the heat, the air first passing through the auxiliary checker-work 9 before entering the checker-work 5. Upon the reversal of the valves $7^a$ $7^b$, 12, and 13 the air and gas pass through the first said regenerators and the products of combustion through the last-mentioned set. A portion of the products may be drawn through pipe 16 by the fan 21 and forced through the producer by accelerated draft in company with fresh oxygen, which may be supplied through the air-inlet 22 or may be furnished wholly or in part from the excess of uncombined oxygen in furnace 1. Products of combustion are thoroughly cooled in passing through a heat-regenerative system of this description, and the cooling action is especially beneficial in the operation of a gas-producer of the type shown.

The auxiliary checker-work may be of a simple construction, and the furnaces now in use may be easily altered to operate by my method. The loss in fuel through inability to save and utilize the sensible heat of producer-gas has amounted in the past ordinarily to from fifteen to twenty per cent. By my invention almost all of this heat is saved and retained for useful work in the furnace, whence it follows that the operation of such a furnace by the gas-producer aforesaid gives an astonishing efficiency of operation and amounting, aside from radiation losses, to nearly one hundred per cent.

The location of the auxiliary regenerator need not be necessarily that shown in the diagrammatic drawing accompanying this specification. This regenerator may be placed beneath the main regenerators or it may be made a part of the main air-regenerator itself. Provision may also be made for passing through the auxiliary regenerator of the total volume of products of combustion only that portion which traverses the gas-regenerator.

I am aware that apparatus has heretofore been employed for utilizing the waste heat of the products of combustion coming from regenerators. Such apparatus has, however, been employed for the regeneration of the heat only in a continuous way. I do not claim such as my invention.

What I claim is—

1. The combination, in a regenerative gas-furnace, of a combustion-chamber, two pairs of reversing-regenerators in which the gas and air are separately heated, at each end of the gas-furnace an auxiliary reversing-regenerator, conduits connecting the gas-regenerators with the auxiliary regenerators to permit the passage of products of combustion from the former into the latter, and means for passing cold air through the auxiliary regenerators in a direction opposite to the previous flow of the products of combustion.

2. The combination, in a regenerative gas-furnace, of a combustion-chamber, two pairs of reversing-regenerators in which the gas and air are separately heated, connections from the gas-regenerators to a part of the air-regenerators remote from the combustion-chamber whereby products of combustion leaving the gas-regenerators may be passed in a direction opposite to the previous direction of the air into the colder portion of the air-regenerators.

3. The combination, in a regenerative gas-furnace, of a combustion-chamber having near each end a pair of reversing-regenerators in which the gas and air are separately heated, connected thereto an auxiliary reversing-regenerator through which, upon reversal, air is drawn in a direction opposite to the previous direction of the products of combustion.

4. The combination, in a reversing regenerative gas-furnace, of a combustion-chamber 2, at each end thereof a pair of air and gas regenerators 5 and 6, and an auxiliary regenerator 9, a conduit for passing the products of combustion leaving the gas-regenerator at one end of the furnace into the auxiliary regenerator at the same end of the furnace, and means for passing air through the said auxiliary regenerator in a direction opposite to the previous direction of said products of combustion.

5. The combination, in a reversing regenerative gas-furnace, of a combustion-chamber, at each end thereof a gas-regenerator, an air-regenerator and an auxiliary regenerator in which the gas and air are separately preheated before entering the combustion-chamber, conduits between the gas-regenerators and auxiliary regenerators whereby proucts of combustion leaving the former may enter the latter, and means for passing air through said auxiliary regenerators in a direction opposite to the previous direction of the products of combustion upon reversal of the air and gas flow in the combustion-chamber.

Signed at New York city, in the county of New York and State of New York, this 14th day of February, A. D. 1905.

CARLETON ELLIS.

Witnesses:
A. M. SENIOR,
A. M. HYATT.